United States Patent
Wong et al.

(10) Patent No.: US 11,743,885 B2
(45) Date of Patent: Aug. 29, 2023

(54) TELECOMMUNICATIONS APPARATUS AND METHODS USING A COMMON SCHEDULING MESSAGE FOR DIFFERENT RANDOM ACCESS PROCEDURES

(71) Applicant: Sony Corporation, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 139 days.

(21) Appl. No.: 16/966,470

(22) PCT Filed: Feb. 1, 2019

(86) PCT No.: PCT/EP2019/052517
§ 371 (c)(1),
(2) Date: Jul. 31, 2020

(87) PCT Pub. No.: WO2019/149896
PCT Pub. Date: Aug. 8, 2019

(65) Prior Publication Data
US 2021/0037553 A1    Feb. 4, 2021

(30) Foreign Application Priority Data
Feb. 2, 2018  (EP) .................. 18154998

(51) Int. Cl.
*H04W 72/1268* (2023.01)
*H04W 72/0453* (2023.01)
(Continued)

(52) U.S. Cl.
CPC ... *H04W 72/1268* (2013.01); *H04W 72/0453* (2013.01); *H04W 74/006* (2013.01); *H04W 74/0833* (2013.01)

(58) Field of Classification Search
CPC .................................... H04W 74/0833
See application file for complete search history.

(56) References Cited

U.S. PATENT DOCUMENTS

| 2010/0254333 A1* | 10/2010 | Shin | H04W 74/02 370/329 |
| 2019/0045554 A1* | 2/2019 | Ye | H04W 74/0833 |
| 2020/0187245 A1* | 6/2020 | Fujishiro | H04W 74/0833 |

FOREIGN PATENT DOCUMENTS

WO    2017/174581 A1    10/2017

OTHER PUBLICATIONS

On NB-IoT EDT indication via PRACH (Year: 2017).*
(Continued)

*Primary Examiner* — Ayanah S George
(74) *Attorney, Agent, or Firm* — XSENSUS LLP

(57) ABSTRACT

A method of operating a network infrastructure equipment in a wireless telecommunications system to support first and second random access procedures, wherein a message size/amount of data for an uplink message of the second random access procedure is different to a message size/amount of data for a corresponding uplink message of the first random access procedure, and wherein the method includes: transmitting a scheduling message comprising an indication of a first set of radio resources to be used for a random access procedure message for the first random access procedure; determining a second set of radio resources for a random access procedure message for the second random access procedure, wherein the second set of radio resources is related to the first set by a predefined relationship; and monitoring for a random access procedure message on both the first and second set of radio resources.

19 Claims, 7 Drawing Sheets

(51) Int. Cl.
  *H04W 74/00* (2009.01)
  *H04W 74/08* (2009.01)

(56) References Cited

OTHER PUBLICATIONS

International Search Report and Written Opinion dated Mar. 26, 2019 for PCT/EP2019/052517 filed on Feb. 1, 2019, 11 pages.
Holma, H., and Toskala, A., "System Architecture Based on 3GPP SAE," LTE for UMTS: OFDMA and SC-FDMA Based Radio Access, John Wiley & Sons, Ltd., Apr. 2009, pp. 25-27.
3GPP, "LTE; Evolved Universal Terrestrial Radio Access (E-UTRA); Medium Access Control (MAC) protocol specification," 3GPP TS 36.321 version 14.2.1 Release 14, ETSI TS 136 321 V14.2.1, May 2017, pp. 1-107.
3GPP, "LTE; Evolved Universal Terrestrial Radio Access (E-UTRA); Physical layer procedures," 3GPP TS 36.213 version 14.2.0 Release 14, ETSI TS 136 213 V14.2.0, Apr. 2017, pp. 1-455.
Ericsson and Qualcomm, "New WID on Even further enhanced MTC for LTE," 3GPP TSG RAN Meeting No. 75, RP-170732 (revision of RP-170465), Dubrovnik, Croatia, Mar. 6-9, 2017, 4 pages.
Ericsson, "Random access for Rel-13 low complexity and enhanced coverage UEs," 3GPP TSG-RAN WG2 No. 91, Tdoc R2-153717, Beijing, P.R. China, Aug. 24-28, 2105, pp. 1-7.
Huawei and Hisilicon, "Revised work item proposal: Enhancements of NB-IoT," 3GPP TSG RAN Meeting No. 73, RP-161901, revision of RP-161324, New Orleans, USA, Sep. 19-22, 2016, 8 pages.
Huawei, et al., "New WID on Further NB-IoT enhancements," 3GPP TSG RAN Meeting No. 75, RP-170852, Dubrovnik, Croatia, Mar. 6-9, 2017, 6 pages.
Mediatek Inc., "On NB-IoT EDT indication via PRACH," 3GPP TSG RAN WG2 Meeting No. 100, R2-1713679, Reno, Nevada, USA, Nov. 27-Dec. 1, 2017, 5 pages.
Nokia and Nokia Shanghai Bell, "Data transmission during random access procedure," 3GPP TSG RAN WG1 Meeting No. 90bis, R1-1717229, Prague, Czech Republic, Oct. 9-13, 2017, 3 pages.

\* cited by examiner transmit a scheduling message comprising an indication of a first set of radio resources to be used for a random access procedure message for the first random access procedure determine a second set of radio resources to be used for a random access procedure message for the second random access procedure, wherein the second set of radio resources is determined from the first set of radio resources in accordance with a predefined mapping between the first set of radio resources and the second set of radio resources monitor for a random access procedure message on both the first set of radio resources and the second set of radio resources

FIG. 12 receiving a scheduling message comprising an indication of a first set of radio resources to be used for a random access procedure message for the first random access procedure determining a second set of radio resources to be used for a random access procedure message for the second random access procedure, wherein the second set of radio resources is determined from the first set of radio resources in accordance with a predefined mapping between the first set of radio resources and the second set of radio resources transmitting a random access procedure message using the second set of radio resources

FIG. 13

TELECOMMUNICATIONS APPARATUS AND METHODS USING A COMMON SCHEDULING MESSAGE FOR DIFFERENT RANDOM ACCESS PROCEDURES

CROSS-REFERENCE TO RELATED APPLICATIONS

The present application is based on PCT filing PCT/EP2019/052517, filed Feb. 1, 2019, which claims priority to EP 18154998.1, filed Feb. 2, 2018, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 12 is a flow chart schematically representing some operating aspects of a base station (network infrastructure equipment) in accordance with certain embodiments of the disclosure; and FIG. 13 is a flow chart schematically representing some operating aspects of a terminal device (UE) in accordance with certain embodiments of the disclosure.

DESCRIPTION OF EXAMPLE EMBODIMENTS

Figure 1:
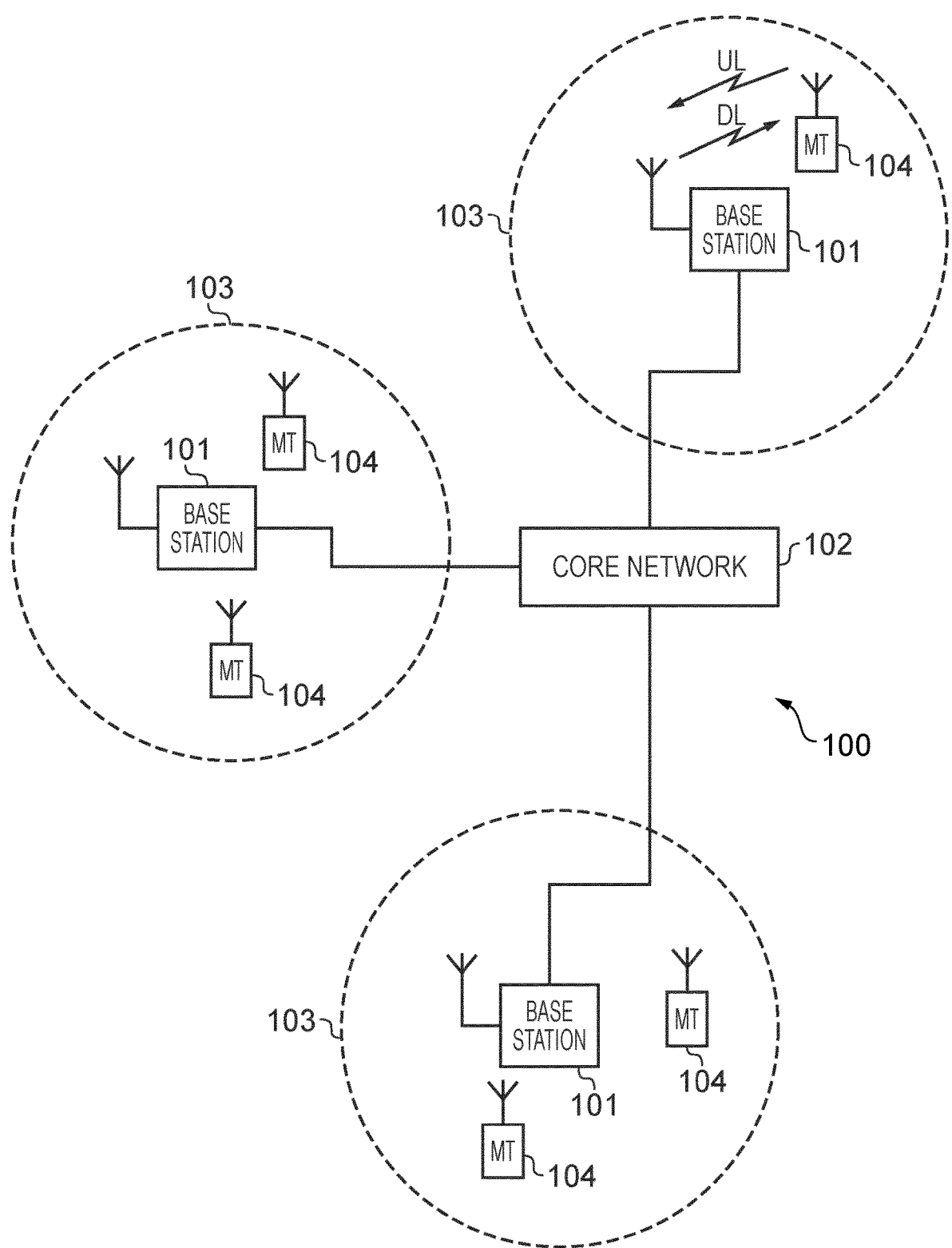
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which together define the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to the base stations of FIG. 1. Thus, the term network infrastructure equipment/access node may be used to encompass these elements and more conventional base-station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may move to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection, which can be particularly helpful for infrequent and short messages type of traffic.

Figure 2:
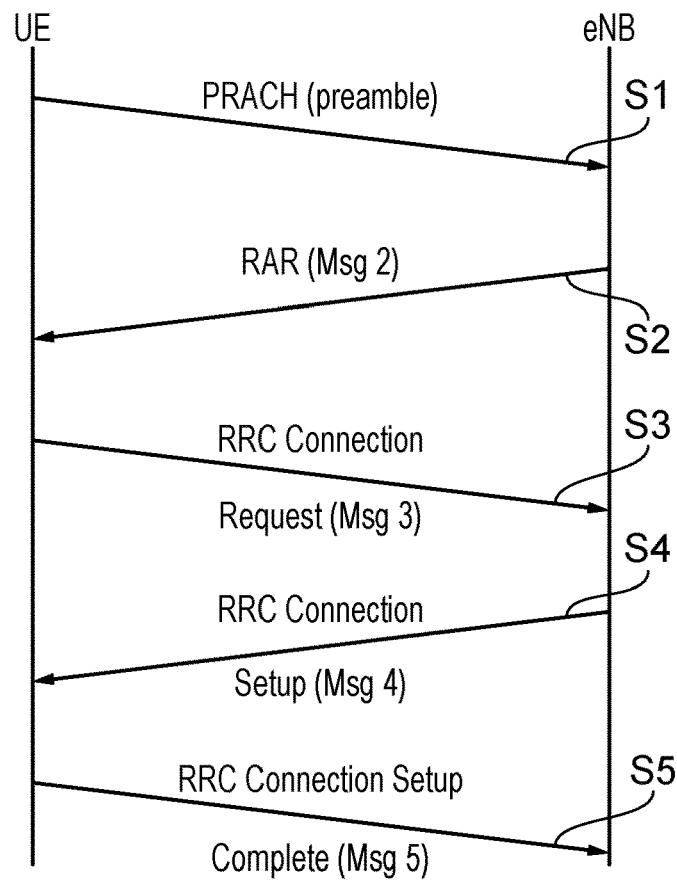
FIG. 2 schematically represents steps in a random access procedure in a wireless telecommunication network.

FIG. 2 is a ladder diagram that schematically shows message exchange between a UE and an eNB in a typical random access procedure to establish an RRC connection, in this example in an LTE-based network. The UE starts the process in step S1 by transmitting a random access request on a physical random access channel (PRACH in an LTE context), i.e. a random access preamble (RACH preamble), to the eNB. In step S2, when the eNB detects this preamble it will respond with a Random Access Response message (RAR), which is also known as Message 2. The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S1, and the RAR will indicate which preamble the eNB has detected and is responding to. It may be noted it is possible that multiple UEs may transmit a random access request using the same PRACH preamble and at the same time and frequency resources. The RAR of step S2 also contains an uplink grant for the preamble the network is responding to so that the UE that transmitted the preamble may use this uplink grant to transmit an RRC Connection Request message, also known as Message 3 to the eNB, in step S3. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNB will respond to Message 3, in step S4, with Message 4 which carries an RRC Connection Setup message. For the case where multiple UEs use the same preamble, Message 4 provides contention resolution functionality, for example using a terminal device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step S5 containing a RRC Connection Setup Complete message.

A previously proposed approach for EDT in uplink is for additional data to be transmitted in association with the RRC connection request message, in Message 3 (step S3 in FIG. 2). For the legacy approach to random access, Message 3 carries only control messages and therefore has a limited Transport Block Size (TBS). In order for Message 3 to carry more useful amounts of data, the 3GPP group has agreed to allow for an increase in the TBS for Message 3 to 1000 bits. However, it has also been agreed that an eNB need not fulfil an EDT request by allocating resources for a TBS for Message 3 up to 1000 bits, but the eNB can instead schedule a smaller TBS as for a legacy Message 3, for example having regard to overall resource availability. In this case the UE may, for example, need to follow the legacy approach of establishing an RRC connection to communicate the data rather than using EDT.

In order for the eNB to identify whether a UE has EDT capability/is requesting an allocation of radio resources for EDT in Message 3, it has been proposed that a set of available PRACH preambles be partitioned such that a sub-group of PRACH preambles is used by a UE supporting EDT to indicate to the eNB its capability and to request EDT over Message 3. Since partitioning the PRACH preambles would result in fewer PRACH resources for legacy (non-EDT) UEs, one possible implementation is to allow legacy UEs without EDT capability to also use the PRACH preambles partitioned for use by EDT capable UEs. This follows from a general preference to avoid partitioning PRACH resources so far as possible since partitioning of resources can impact trunking efficiency and reduce statistical multiplexing gain.

Figure 3:
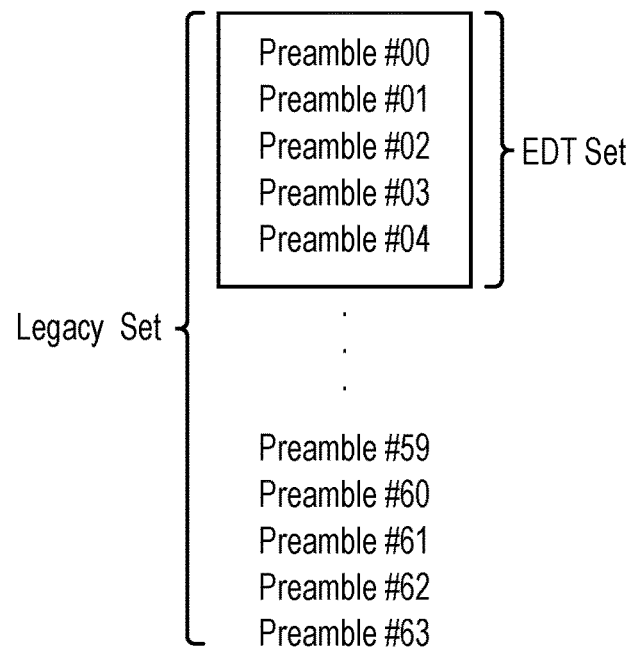
FIG. 3 schematically represents an example allocation of PRACH preambles for use by different types of terminal device.

FIG. 3 schematically represents one approach for allocating PRACH preambles for use by legacy UEs and EDT-capable UEs (which may be referred to hereon as EDT-UEs). In this example the eNB has 64 PRACH preambles, i.e., {Preamble #00, Preamble #01, . . . , Preamble #63}. A partition comprising of 5 preambles is allocated for use by EDT-UEs to indicate their EDT capability, i.e. EDT Set={Preamble #00, Preamble #01, Preamble #02, Preamble #03, Preamble #04} in the example of FIG. 3. In accordance with the principles noted above, to help maximize the PRACH preamble resource for legacy UEs, the legacy UEs are allowed to use all 64 PRACH preambles, including those in the EDT set, i.e. Legacy Set={Preamble #00, Preamble #01, . . . , Preamble #63}.

A drawback of allowing legacy UEs to use the same PRACH preambles as EDT UEs is that the eNB would not generally know when it first detects a PRACH preamble from within the EDT Set whether is comes from a legacy UE or an EDT UE. It has been proposed for the RAR (Message 2) response sent from the eNB to include an indication of whether or not the RAR is allocating resources for EDT in Message 3. This can be achieved by using an existing spare/reserved bit in RAR to provide a flag for such an indication. Since a legacy UE would in effect ignore the spare/reserved bit, the legacy UE will assume a TBS for a legacy Message 3 is scheduled, e.g., the legacy UE will use a legacy MCS (modulation code scheme) table to derive TBS in the normal way. However, an EDT capable UE may be configured to recognize the setting of the reserved bit in the RAR to indicate an EDT allocation for Message 3 and use an EDT MCS table accordingly. The eNodeB can then perform blind decoding operations on the Message 3 (under the hypotheses that (i) the UE is EDT capable and (ii) the UE is a legacy UE) in order to decode Message 3. As noted above, it is possible more than one UE may use the same preamble and time and frequency resources to access the network, and so it is therefore possible for a legacy UE and an EDT capable UE to use the same preamble.

Certain embodiments of the disclosure propose approaches in which a single scheduling message transmitted by a base station as part of a random access procedure may be interpreted differently by different types of terminal device. For example, the scheduling message may indicate a first set of radio resources allocated for use by a legacy terminal device, and the legacy terminal device may interpret the scheduling message as allocating the first set of radio resources in the conventional way. However, an EDT-capable terminal device may be configured to interpret the scheduling message as allocating a second set of radio resources which is different from the first set of radio resources. That is to say, the terminal device may be configured to determine the second set of radio resources from the first set of radio resources in accordance with a predefined mapping (i.e. based on a predefined relationship). This allows the base station to use a single scheduling message to allocate different sets of radio resources for different terminal devices.

Figure 4:
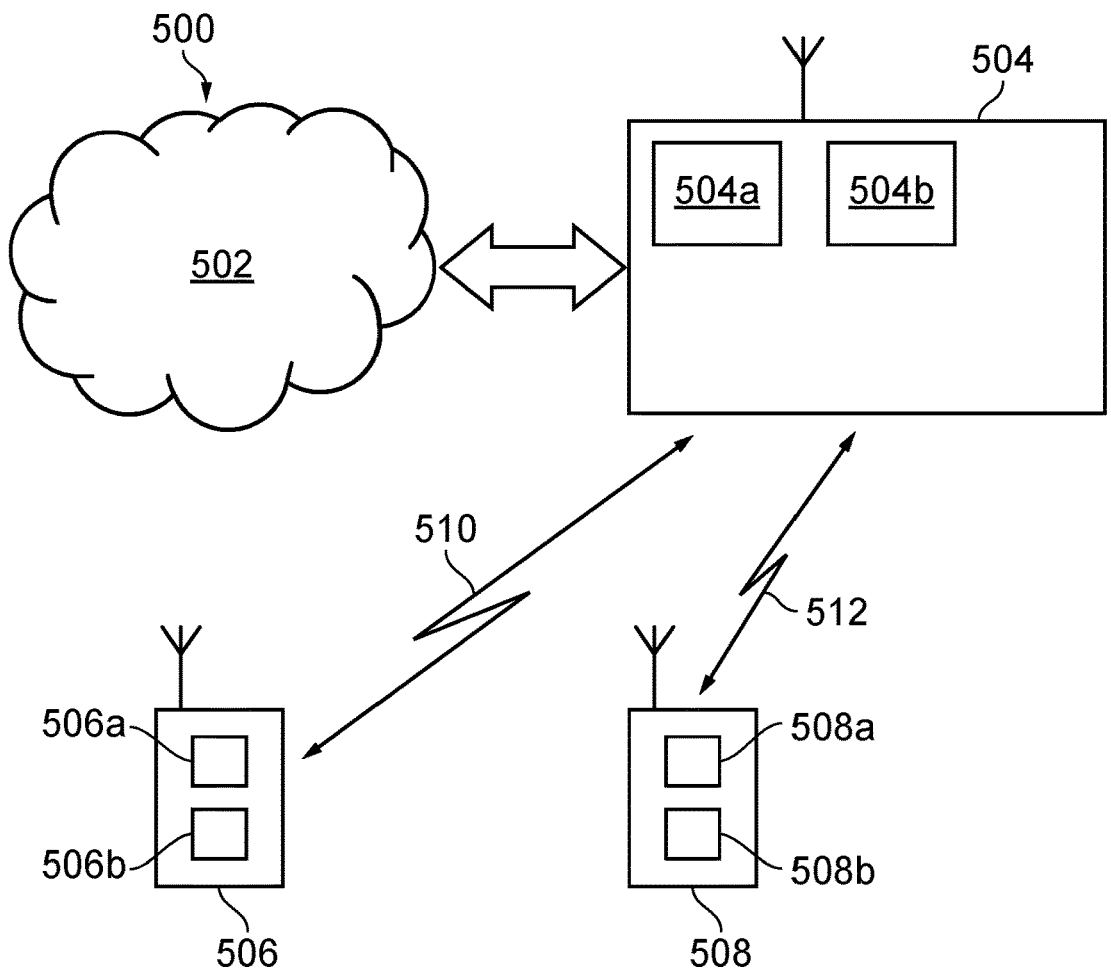
FIG. 4 schematically represents some aspects of a wireless telecommunication system in accordance with certain embodiments of the present disclosure.

FIG. 4 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 4 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 4 may be broadly conventional apart from where modified to provide functionality in accordance with embodiments of the present disclosure as discussed herein.

In this example, it is assumed the first terminal device 506 is a conventional smartphone-type terminal device communicating with the base station 504 in a conventional manner (i.e. the first terminal device is a legacy terminal device that does not support EDT). It will be appreciated the first terminal device need not be a smartphone-type terminal device and could equally be another type of legacy terminal device, including a device that has the capability to support EDT, but is currently not doing so. The conventional/legacy terminal device 506 comprises transceiver circuitry 506a (which may also be referred to as a transceiver/transceiver unit) for transmission and reception of wireless signals and processor circuitry 506b (which may also be referred to as a processor/processor unit) configured to control the device 506. The processor circuitry 506b may comprise various sub-units/sub-circuits for providing functionality as explained further herein. These sub-units may be implemented as discrete hardware elements or as appropriately configured functions of the processor circuitry. Thus the processor circuitry 506b may comprise circuitry which is suitably configured/programmed to provide the desired functionality using conventional programming/configuration techniques for equipment in wireless telecommunications systems. The transceiver circuitry 506a and the processor circuitry 506b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s) / circuitry/chip(s)/chipset(s). As will be appreciated the legacy (non-EDT) terminal device 506 will in general comprise various other elements associated with its operating functionality.

In this example, it is assumed the second terminal device 508 is a machine-type communication (MTC) terminal device 508 adapted to support EDT (i.e. the second terminal device may be referred to as an EDT terminal device/UE). In this regard, the second terminal device 508 may be a reduced capability terminal device, for example a terminal device able to operate on a restricted bandwidth as compared to conventional terminal devices (i.e. what might be referred to as a narrowband device). However, it will be appreciated this represents merely one specific implementation of approaches in accordance with embodiments of the disclosure, and in other cases, the same principles may be applied in respect of terminal devices that support EDT but which are not reduced capability terminal devices, but may, for example, comprise smartphone terminal devices, or indeed any other form of terminal device, that may be operating in a wireless telecommunications system. It will be appreciated that an EDT terminal device may also function as a non-EDT/legacy terminal device, e.g. when it does not want to use EDT.

The EDT terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 4 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may comprise various sub-units/sub-circuits for providing desired functionality as explained further herein. These sub-units may be implemented as discrete hardware elements or as appropriately configured functions of the processor circuitry. Thus the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 4 as separate elements for ease of representation. However, it will be appreciated that the functionality of these circuitry elements can be provided in various different ways, for example using one or more suitably programmed programmable computer (s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with both the legacy terminal device 506 and the EDT terminal device 508 according to an embodiment of the disclosure over respective communication links 510, 512. The base station 504 is configured to communicate with the legacy terminal device 506 over the associated radio communication link 510 and with the EDT UE 508 over the associated radio communication link 512 generally following the established principles of LTE-based communications, apart from using modified random access procedures in accordance with certain embodiments of the present disclosure as described herein.

One aspect of certain embodiments of the disclosure is that different types of terminal device may be configured to derive different resource allocations from the same information in a single scheduling message. This can allow one scheduling message (e.g. a random access procedure RAR or a request to retransmit a random access procedure message three) to in effect grant different resources for corresponding messages for different terminal devices (e.g. random access procedure message threes or retransmissions of random access procedure message threes). Thus a base station may operate to communicate with a first class (group/type) of terminal device, such as the non-EDT first terminal device, using a first random access procedure and to communicate with a second class (group/type) of terminal device, e.g. the EDT capable second terminal device, using a second random access procedure, wherein the first and second random access procedures differ by virtue of a common scheduling message being used to allocate different radio resources for use in the different random access procedures. Apart from this difference in the way resources are allocated for the two random access procedures, in so far as the procedures comprise corresponding steps, these may otherwise be the same in terms of the general sequence/series of random access messages that comprise each of the procedures, and in particular each procedure may be generally based on a random access message sequence corresponding to that shown in FIG. 2. In this regard it will be appreciated that while the random access procedures may be generally based on the approach represented in FIG. 2, they need not comprise steps corresponding to all the steps represented in FIG. 2. For example, the second random access procedure which uses EDT might not comprise steps corresponding to steps S4 and/or S5 in FIG. 2 as the procedure may instead be deemed complete when the EDT data has been transmitted in step S3, or after step S4, for example if contention resolution is needed.

As noted above the RAR in a random access procedure contains a grant of uplink resources for a random procedure message (i.e. what may, for convenience of terminology, be referred to here as a Message 3 (Msg 3) based on the terminology used in LTE). In an LTE context the information content and interpretation of the UL grant for a legacy terminal device is set out in the relevant standards, e.g. in 3GPP TS36.213 (Release 14) [6]. Thus in Release 14 LTE the higher layers indicate a 20-bit UL Grant to the physical layer, as defined in 3GPP TS 36.321 (Release 14) [7] which is referred to the Random Access Response Grant in the physical layer.

The content of the 20 bits, starting with the MSB (most significant bit) and ending with the LSB (least significant bit) are as follows:

Hopping flag—1 bit (this bit governs whether the uplink resources on PUSCH (physical uplink shared channel) are frequency hopped)

Fixed size resource block assignment—10 bits (these bits indicate the allocated resource blocks which are derived using a predefined mapping/derivation function)

Truncated modulation and coding scheme—4 bits (these bits indicate the MCS index for the uplink grant)

TPC command for scheduled PUSCH—3 bits (these bits indicate the power level for the uplink grant)

UL delay—1 bit (this bit governs whether delayed PUSCH is configured)

CSI request—1 bit (this bit governs whether a channel quality indicator is to be included in the PUSCH transmission)

In accordance with certain example implementations of the disclosure an EDT-capable UE may be configured to interpret as aspect of the RAR UL grant message differently to a legacy UE, e.g. by using a different mapping/derivation function to determine the allocated resources from the fixed size resource block assignment information or by applying a different frequency hopping pattern. Thus, in effect, a RAR uplink grant may indicate a first set of radio resources to be used for a random access procedure message for a legacy terminal device, and an EDT-capable terminal may determine a second, different, set of radio resources to be used for a corresponding random access procedure message, where the second set of radio resources is determined from the first set of radio resources in accordance with a predefined relationship between them. In this regard it will be appreciated the relationship may be based on a direct mapping from the first set of radio resources to the second set of radio resources (e.g. an EDT-UE may initially determine the first set of radio resources and then modify this in accordance with a predefined function to establish the second set of radio resources) or an indirect mapping (e.g. resulting from both types of UE determining their allocated radio resources differently from the information in the RAR UL grant). The base station transmitting the RAR may thus monitor both the first set of radio resources and the second set of radio resources for a response to the RAR UL grant to be able to separately receive a message three from both types of UE without contention.

Figure 5:
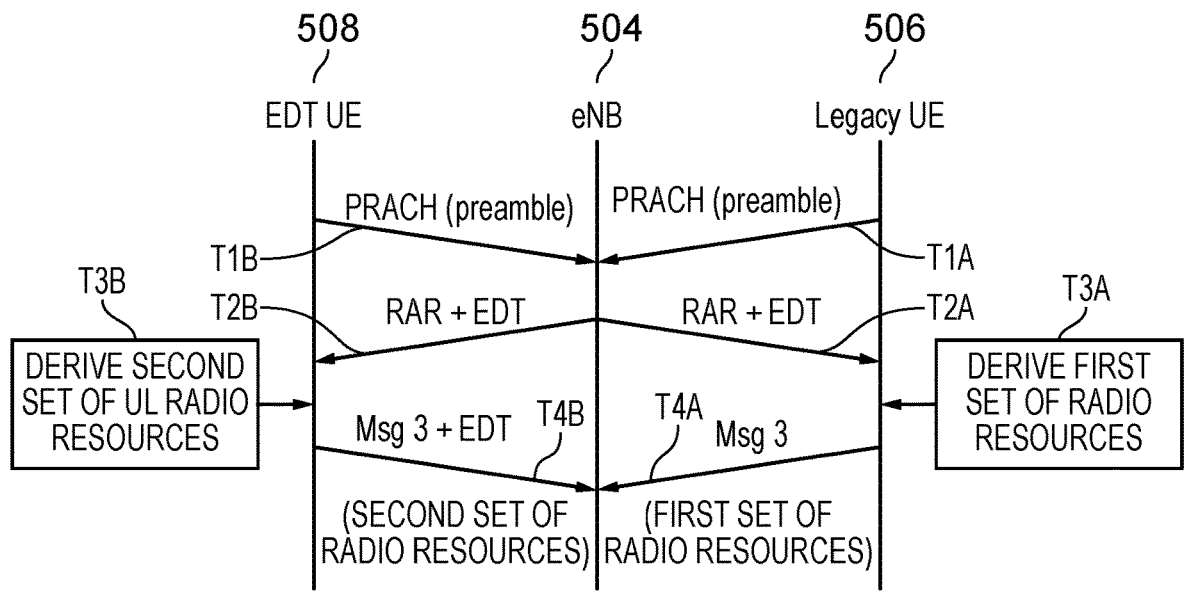
FIG. 5 is a signalling ladder diagram schematically representing some operating aspects of wireless telecommunications systems in accordance with certain embodiments of the disclosure.

FIG. 5 is a ladder diagram schematically showing steps of first and second random access procedures respectively undertaken by the legacy terminal device 506 (right-hand node in FIG. 5), the EDT-capable terminal device 508 (left-hand node in FIG. 5), and the base station 504 (centre node in FIG. 5) represented in FIG. 4 in accordance with certain embodiments of the disclosure. As already mentioned, it will be appreciated aspects of this operation which are not specifically described herein, for example the particular signalling protocols adopted, may be implemented in accordance with conventional techniques for communicating in wireless telecommunications systems. It will further be appreciated the process of FIG. 5 for each terminal device is closely based on the process represented in FIG. 2, and aspects of FIG. 5 which correspond with aspects of FIG. 2 are not discussed in detail in the interests of brevity.

For the scenario represented in FIG. 5 it is assumed both the legacy terminal device 506 and the EDT-capable terminal device determine, by coincidence, they should initiate a random access procedure at around the same time. This may be, for example, because the legacy terminal device wishes to transition to an RRC connected mode to uplink data (i.e. transmit uplink data to the base station) and the EDT-capable terminal wishes to uplink data (i.e. transmit uplink data to the base station) in an EDT approach (i.e. as part of a random access procedure as discussed above). It will be appreciated the specific reasons why the terminal devices have data to uplink and the information content of the data are not significant to the principles described herein.

Thus, as schematically indicated in steps T1A and T1B of the signalling represented in FIG. 5, the legacy terminal device 506 and the EDT-capable terminal device 508 each transmit a PRACH preamble to the base station 504, and in this example scenario are assumed to have selected the same PRACH preamble (e.g. one of the preambles in the EDT set in FIG. 3) and the same transmission resources to do this.

On detecting a terminal device has transmitted a preamble from the EDT set of preambles it is assumed here the base station decides it will allow the use of EDT (if it is needed—at this stage the base station does not know if a received PRACH preamble has come from an EDT-capable UE). This determination may be based on the extent to which the base station currently has sufficient resources available to support EDT, for example having regard to conventional scheduling decision processes in wireless telecommunications systems. It may be noted that in general the base station will typically not be aware that more than one UE has sent the same preamble.

Thus in response to detecting a terminal device has transmitted a preamble from the EDT set, and having determined to allow EDT over Message 3, the base station transmits a RAR indicating EDT is available (e.g. based on setting an EDT flag using one of the reserved bits in the RAR as discussed above) which is received by both UEs 506, 508, as indicted in FIG. 5 in steps T2A and T2B. The RAR may be conventional and include an indication of an allocation of radio resources for transmitting a subsequent message three in the usual way. As indicated in step T3A, the legacy terminal device 506 derives a first set of radio resources to use for its Message 3 according to a first interpretation of the scheduling information in the RAR it received in step T2A, and may proceed to transmit its message three using the first set of radio resources, as indicated in step T4A. As indicated in step T3B, and in accordance with certain embodiments of the disclosure, the EDT-capable UE instead derives a different second set of radio resources to use for its Message 3 according to a second interpretation of the scheduling information in the RAR it received in step T2B, and may proceed to transmit its Message 3 (with EDT) using the second set of radio resources, as indicated in step T4B.

Thus, by applying different interpretations to a scheduling message received from a base station the two types of terminal device may be configured to transmit uplink signalling in response to the scheduling message on different resources, thereby helping to avoid a collision.

Following the processing steps represented in FIG. 5 the respective terminal devices may continue in accordance with known approaches. For example the legacy device 506 may continue to complete the RRC connection procedure while the EDT-capable device, having sent its EDT data in step T4B, may return to its previous state.

Thus in accordance with this approach the use of different interpretations of a single scheduling message by different terminal devices (i.e. such that one terminal device derives a first set of radio resources while another terminal device derives a second set of radio resources that is related to the first set of radio resources in accordance with a predefined relationship/mapping) can help reduce contention/interference for the terminal devices' respective random access procedures.

In some examples, an EDT capable UE might be configured to only apply the different interpretation of the UL grant (i.e. to use the second set of radio resources for its message three rather than the first set of radio resources as for a legacy device) if the eNB indicates that the UE can perform EDT over Message 3, e.g. by appropriate setting of an EDT indicator bit in the RAR. That is to say, if the RAR indicates the eNB will not support EDT for the current random access procedure, an EDT-UE may in effect revert to behave as a legacy UE.

In some examples, an EDT capable UE might only use the different interpretation of the UL grant if the eNB has enabled EDT functionality in the cell, which may, for example, be indicated in SIB (system information block) signalling or UE specific RRC (radio resource control) configuration signalling. That is to say, if the cell is not configured to support EDT, an EDT-UE may in effect behave as a legacy UE.

In some examples, an EDT capable UE might be configured to select for a given random access procedure whether to interpret the UL grant as an EDT UL grant or as a legacy UL grant (i.e. whether to send its Message 3 using the first set of radio resources as derived by a legacy UE or using the second set of radio resources provided to support EDT). Typically a legacy UL grant (i.e. scheduling the first set of radio resources) will typically grant fewer UL resources (e.g. a smaller transport block size) than an EDT UL grant (i.e. scheduling the first set of radio resources). Thus if the UE needs to only transmit a small amount of UL data (i.e. an amount that can be transmitted using the first set of radio resources), it may be configured to interpret the UL grant as a legacy UL grant.

There are various different ways in which the scheduling message may be differently interpreted which correspond to various different ways in which the first and second sets of radio resources may be related.

Figure 6:
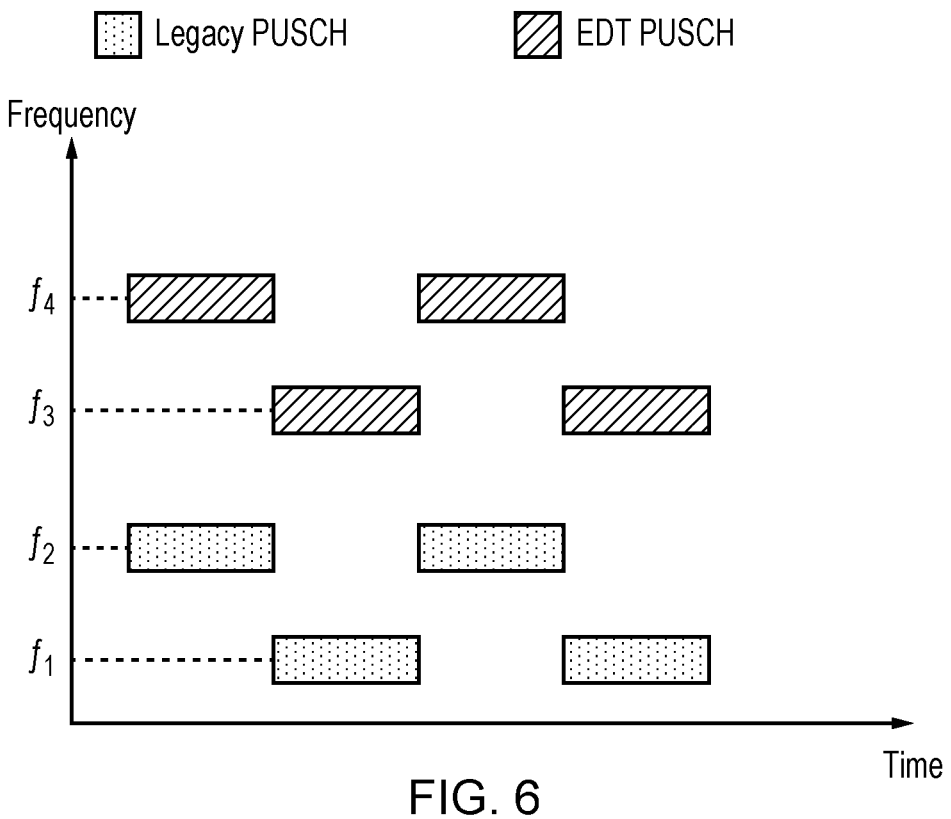
FIGS. 6 to 8 schematically represent different allocations of radio resources derived from different interpretations of a scheduling message by different types of terminal device.

In some examples, the different interpretation may relate to how frequency hopping is applied (i.e. the frequency hopping pattern to use) when frequency hopping is enabled. In this regard it may be noted in an LTE efeMTC context, the network indicates the use of frequency hopping (e.g. hopping pattern) via RRC signalling and frequency hopping is enabled in CE Mode A (i.e. operation within LTE coverage) if this is indicated in the UL grant and is enabled in CE Mode B (i.e. operation in enhanced coverage) if the RRC configuration indicates the use of frequency hopping. For frequency hopping in efeMTC, the PUSCH hops between two frequencies (i.e. narrowbands). In accordance with certain embodiments of the disclosure an EDT capable UE may use a different frequency hopping pattern (e.g. different frequencies) to that used by the legacy UE. FIG. 6 shows an example of this.

FIG. 6 schematically represents a time and frequency radio resource grid showing one example of how different types of terminal device may derive different uplink radio resource allocations from a single RAR UL grant message in accordance with certain embodiments of the disclosure. Here it is assumed a legacy terminal device interprets the RAR as allocating a first set of radio resources for a message three on PUSCH comprising frequency hopped radio resources as indicated in FIG. 6 by the blocks without cross hatching (i.e. hopping between frequencies f1 and f2). The legacy terminal device may interpret the RAR to derive the first set of radio resources in the usual way. However, an EDT-capable terminal device interprets the RAR as allocating a second set of radio resources for a message three on PUSCH, which in this example comprises frequency hopped radio resources as indicated in FIG. 6 by the blocks with cross hatching (i.e. hopping between frequencies f3 and f4). The EDT-capable terminal device may interpret the RAR to derive this example second set of radio resources by first determining the first set of radio resources from the RAR in the usual way and then adding a predefined frequency offset, or the EDT-legacy UE may be specifically configured to use frequencies f3 and f4 instead of f1 and f2. It will be appreciated the specific manner in which the EDT-capable terminal device is provided with information regarding the alternative interpretation to apply (e.g. the magnitude and direction of a frequency offset, frequencies for hopping) is not of primary significance. For example, it may be established in accordance with an operating standard for the wireless telecommunications system, or the EDT-capable terminal device may be configured by the network to apply the appropriate interpretation by system information signalling or previous RRC configuration signalling.

Figure 7:
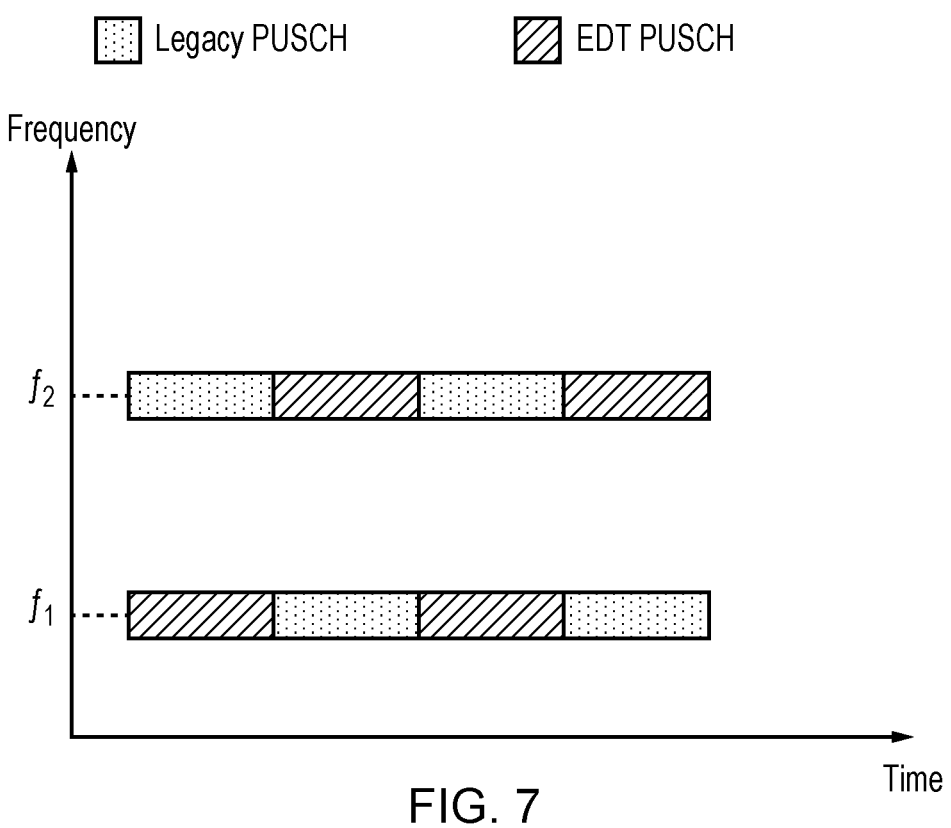

FIG. 7 is similar to, and will be understood from FIG. 6 but shows another example of how different types of terminal device may derive different uplink radio resource allocations from a single RAR UL grant message in accordance with certain embodiments of the disclosure. Here it is assumed a legacy terminal device interprets the RAR as allocating a first set of radio resources for a Message 3 on PUSCH comprising frequency hopped radio resources as indicated in FIG. 7 by the blocks without cross hatching (i.e. hopping between frequencies f1 and f2, starting in f2). The legacy terminal device may interpret the RAR to derive the first set of radio resources in the usual way. However, an EDT-capable terminal device interprets the RAR as allocating a second set of radio resources for a Message 3 on PUSCH, which in this example comprises frequency hopped radio resources as indicated in FIG. 6 by the blocks with cross hatching (i.e. also hopping between frequencies f1 and f2, but starting on f1). The alternative approach to interpreting the grant in RAR in this example may be considered to correspond to inverting the frequency hopped pattern. The EDT-capable terminal device may thus interpret the RAR to derive this example second set of radio resources by first determining the first set of radio resources from the RAR in the usual way and then applying a predefined frequency offset, where the magnitude of the offset corresponds to the difference between f1 and f2 and the direction of the offset is positive for radio resources in the first set of resources on the lower frequency and negative for radio resources in the first set of resources on the upper frequency. Alternatively, the EDT-legacy UE may simply be configured to reverse the frequency bands for the hopping pattern. Thus with the example of FIG. 7 both legacy devices and EDT-capable devices use the same set of frequencies {f1, f2} but when the legacy UE uses one frequency, e.g. f1, the EDT capable UE uses the other frequency f2, and vice versa. One characteristic of this approach, as compared to the approach of FIG. 6, is that it does not rely on using additional frequency bands, and this may in some cases be considered to help simplify overall scheduling within the system.

More generally, in other examples the different interpretation of the resource allocation in a scheduling message may result in one type of terminal device (e.g. an EDT terminal device for the examples focused on here) using different frequency resources for the scheduled message than another type of terminal device (e.g. a legacy terminal device). For example, the RAR UL grant assigns a narrowband for the transmission of PUSCH carrying the scheduled message three for a legacy terminal UE, but the EDT-capable UE may instead use a different narrowband to that of the legacy UE for the same UL grant. Two example approaches of this are schematically shown in FIGS. 8A and 8B.

Figure 8A:
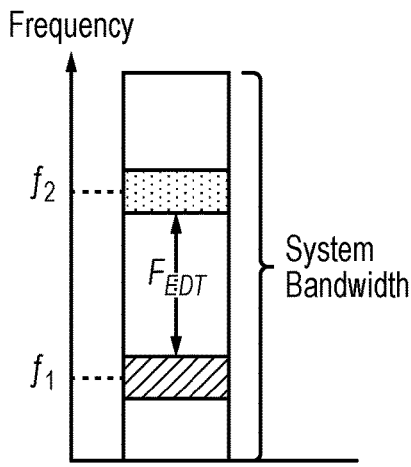
Figure 8B:
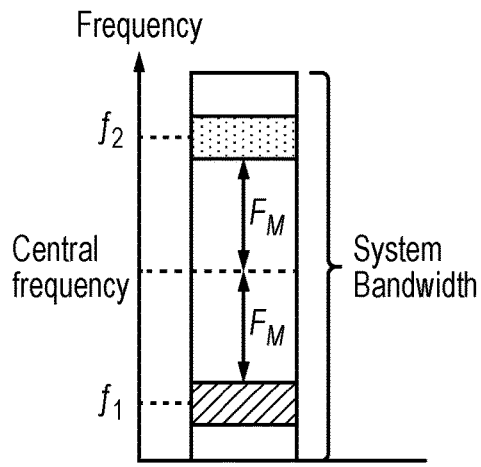

FIGS. 8A and 8B each schematically represent a system frequency bandwidth showing an example of how different types of terminal device may use different frequency sub-bands for the uplink radio resource allocations in a RAR UL grant message in accordance with certain embodiments of the disclosure. Here it is assumed a legacy terminal device interprets the RAR as allocating a first set of radio resources in a frequency sub-band centred on f2, as indicated in FIGS. 8A and 8B by the blocks without cross hatching, while an EDT-capable terminal device interprets the RAR as allocating a second set of radio resources in a frequency sub-band centred on f1, as indicated in FIGS. 8A and 8B by the blocks with cross hatching. In FIG. 8A the relationship between the first and second sets of radio resources is such that radio resources comprising the second set of radio resources are offset in frequency from corresponding radio resources comprising the first set of radio resources by a predefined fixed frequency offset $F_{EDT}$. In FIG. 8B the relationship between the first and second sets of radio resources is such that radio resources comprising the second set of radio resources are mirrored about a central frequency for the system frequency bandwidth. That is to say, the radio resources comprising the second set of radio resources are offset in frequency from the corresponding radio resources comprising the first set of radio resources by an amount that is twice the difference $F_M$ between frequencies for the radio resources comprising the first set of radio resources and a predefined fixed frequency (e.g., a central frequency). It will be appreciated FIGS. 8A and 8B show merely two example approaches and different relationships between the frequencies for radio resources in the first (legacy) and second (EDT) sets of radio resources may be used in other implementations. Again, the specific relationship for a given implementation may be established in accordance with an operating standard for the wireless telecommunications system (i.e. defined by specification) or may be configured by prior signalling (e.g. system information signalling or radio resource control signalling).

Whereas the above examples have focused on implementations in which the relationship between the first set of radio resources and the second set of radio resources is such that they comprise different frequency resources, in other example implementations the relationship between the first set of radio resources and the second set of radio resources may be such that they comprise different time resources. That is to say, radio resources in the second set of radio resources may be offset in time (and potentially also in frequency) from corresponding radio resources in the first set of radio resources.

Thus, in some examples, the different interpretation may result in a different delay between the UL grant and the transmission of the Message 3 for the different types of terminal device/types of random access procedure. For eMTC in an LTE context there is a fixed delay of 4 ms between the UL grant and the PUSCH transmission (i.e. that carries the Message 3). For NB-IoT in an LTE context, the delay between the UL grant and the PUSCH transmission is indicated in the UL grant.

Figure 9:
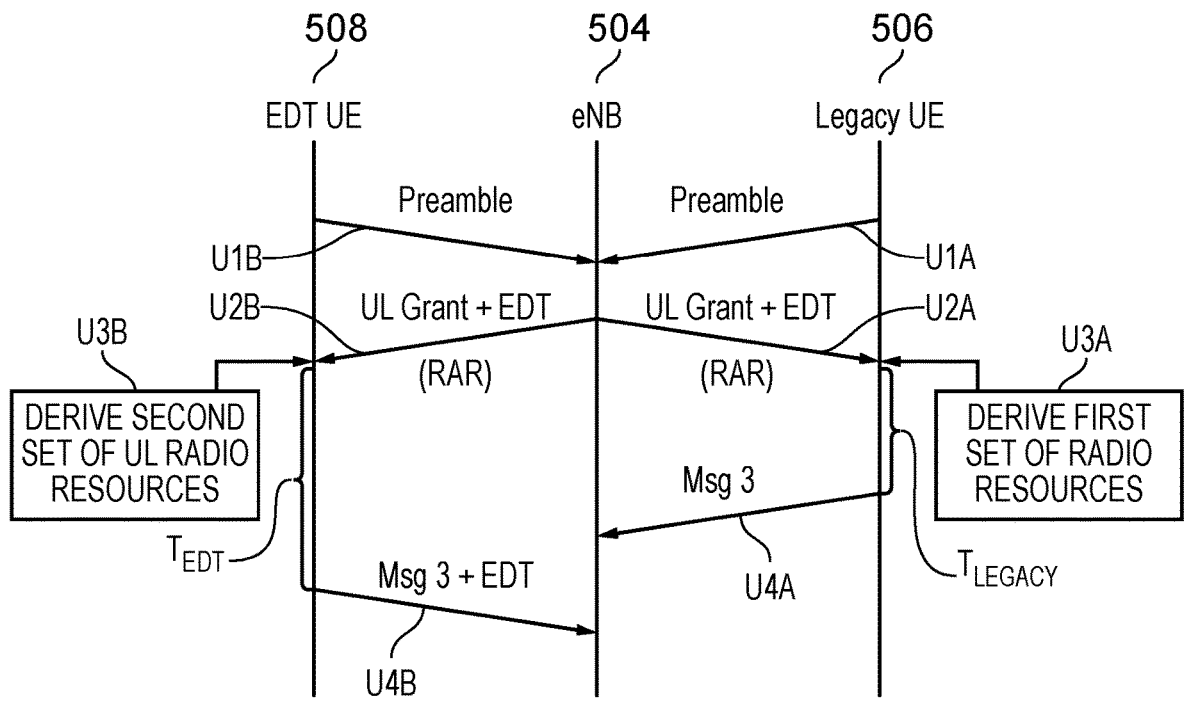
FIGS. 9 to 11 are signalling ladder diagrams schematically representing some operating aspects of wireless telecommunications systems in accordance with certain embodiments of the disclosure.

An example of this approach is shown in FIG. 9 which is similar to, and will be understood from, FIG. 5. Thus FIG. 9 is a ladder diagram schematically showing steps of first and second random access procedures respectively undertaken by the legacy terminal device 506 (right-hand node in FIG. 9), the EDT-capable terminal device 508 (left-hand node in FIG. 9), and the base station 504 (centre node in FIG. 9) represented in FIG. 4 in accordance with certain embodiments of the disclosure. It will again be appreciated the process of FIG. 9 for each terminal device is closely based on the process represented in FIG. 2, and aspects of FIG. 9 which correspond with aspects of FIG. 2 are not discussed in detail in the interests of brevity.

As for FIG. 5, for the scenario represented in FIG. 9 it is assumed both the legacy terminal device 506 and the EDT-capable terminal device determine, by coincidence, they should initiate a random access procedure at around the same time. Thus, as schematically indicated in steps U1A and U1B of the signalling represented in FIG. 9, the legacy terminal device 506 and the EDT-capable terminal device 508 each transmit a PRACH preamble to the base station 504, and in this example scenario are assumed to have selected the same PRACH preamble (e.g. one of the preambles in the EDT set in FIG. 3) and the same transmission resources to do this.

On detecting a terminal device has transmitted a preamble from the EDT set of preambles it is assumed here, as for FIG. 5, the base station again decides it will allow the use of EDT.

Thus in response to detecting a terminal device has transmitted a preamble from the EDT set, and having determined to allow EDT over Message 3, the base station transmits a RAR providing an indication of uplink resources for message three and indicating EDT is available (e.g. based on setting an EDT flag using one of the reserved bits in the RAR as discussed above). The RAR signalling is received by both UEs 506, 508, as indicted in FIG. 9 in steps U2A and U2B. The RAR may be conventional and include an indication of an allocation of radio resources for transmitting a subsequent message three in the usual way. As indicated in step U3A, the legacy terminal device 506 derives a first set of radio resources to use for its Message 3 according to a first interpretation of the scheduling information in the RAR it received in step U2A. This may be derived in the usual way and result in the legacy UE waiting for a time $T_{LEGACY}$ after receiving the RAR in step U2A before transmitting its message 3 on the relevant time and frequency resources comprising the first set of radio resource in step U4A. The value for $T_{LEGACY}$ may be determined by the legacy UE 506 in the usual way, for example it may be fixed, e.g. 4 ms for eMTC in an LTE context, or signalled in the RAR UL grant for NB-IoT in an LTE context. As indicated in step U3B, and in accordance with certain embodiments of the disclosure, the EDT-capable UE derives a second, different, set of radio resources to use for its message three according to a second interpretation of the scheduling information in the RAR it received in step U1B. In this example it is assumed the EDT-capable UE 508 is configured to derive the second set of radio resources in a similar manner to how the legacy UE 506 derives the first set of radio resources, except for applying a different delay $T_{EDT}$ after receiving the RAR in step U2B before transmitting its message 3 (with EDT) on the relevant time and frequency resources comprising the second set of radio resource in step U4B. The value for $T_{EDT}$ may be determined by the EDT-UE 508 from the value of $T_{LEGACY}$ (which the EDT-UE may determine in the same way as for the legacy UE). For example, $T_{EDT}$ may correspond to a fixed offset from $T_{LEGACY}$, e.g., $T_{EDT}=T_{LEGACY}+T_{OFFSET}$, where $T_{OFFSET}$ may be positive (as in FIG. 9) or negative.

It will be appreciated that if the base station decides not to allow EDT (e.g. because it is not supported in the cell, or the base station temporarily does not have sufficient resource to support it for the current random access procedure), the EDT-capable UE may instead use the first set of radio resources (i.e. associated with the delay $T_{LEGACY}$) rather than the second set of radio resources (i.e. associated with the delay $T_{EDT}$).

In some examples different types of terminal device may be configured to use different identifiers for receiving the scheduling message. In the legacy system, the DCI (downlink control information) that schedules the RAR uses the RA-RNTI (random access radio network temporary identifier), which is a function of the time and frequency resources used to transmit the preamble. In accordance with certain embodiments of the disclosure a different derivation of RA-RNTI may be used by an EDT capable UE to produce a different RNTI, e.g. what might be referred to as an EDT-RNTI. For example an offset can be applied to the time and/or frequency used to derive the RNTI. This said offset can be signalled in the SIB, RRC configured or specified in the specifications. Thus certain approaches in accordance with embodiments of the disclosure may provide a method of operating a network infrastructure equipment in a wireless telecommunications system to support a first random access procedure for a first terminal device and a second random access procedure for a second terminal device, wherein an amount of data for an uplink message of the second random access procedure is different to an amount of data for a corresponding uplink message of the first random access procedure, and wherein the method comprises: receiving a random access request on a set of radio resources; establishing a first temporary identifier based on the set of radio resources used for the random access request in accordance with a first function, establishing a second temporary identifier based on the set of radio resources used for the random access request in accordance with a second, different, function; transmitting a first response to the random access request addressed to the first temporary identifier; and transmitting a second response to the random access request addressed to the second temporary identifier. This approach may further provide a method of operating a terminal device adapted to use either one of the first and second random access procedures, wherein the method comprises: transmitting a random access request on a set of radio resources; selecting one of the first and second random access procedures to use, and establishing a first temporary identifier based on the set of radio resources used for the random access request in accordance with a first function if the first random access procedure is to be used, and establishing a second temporary identifier based on the set of radio resources used for the random access request in accordance with a second, different, function if the second random access procedure is to be used; monitoring for a response to the random access request addressed to the first temporary identifier if the first random access procedure is to be used; and monitoring for a response to the random access request addressed to the second temporary identifier if the second random access procedure is to be used.

In some examples, a MCS (modulation coding scheme) table may interpreted differently for legacy UEs and EDT UEs. For example, for legacy UEs, in Release-14, the MCS is interpreted as corresponding to MCS indices 0 through 15 in Table 8.6.1-1 in 3GPP TS 36.213 [6]. In accordance with certain embodiments of the disclosure, for EDT UEs, the MCS may instead be interpreted as corresponding to different rows in this table (e.g. rows 2 to 17). This recognizes that EDT transmissions will typically transmit larger transport block sizes, which are more robust when Turbo coded, allowing a higher MCS to be transmitted at the same SINR.

In some examples the different interpretation of a scheduling message may be the size of the resource block assignment. For example, for EDT, the resource block assignment may be interpreted as being "N" times as large as the resource block assignment interpreted for a legacy RAR indicated in the scheduling message. The EDT resource block assignment can, for example, be arranged to comprise a repetition in the frequency domain of the legacy resource block assignment. The parameter "N" may, for example, be UE-specific RRC signalled, SIB signalled or defined in the specifications. This approach recognises the transport block size for EDT may be larger than the TBS for legacy Message 3, and hence more physical resource may be allocated for the EDT transmission to allow for a desired MCS.

The examples set out above have primarily focused on approaches in which different types of terminal device interpret the scheduling message received in RAR for Message 3 in a random access procedure in different ways. However, in accordance with other examples, the different types of terminal devices may instead, or in addition, interpret the scheduling message for a retransmission for Message 3 in a random access procedure in different ways.

Thus in some examples the UL grant for RAR may not be interpreted differently by different terminal devices, but the UL grant for retransmission of Message 3 may be interpreted differently. This approach can help reduce the amount of blind decoding needed for the eNB to decode for message 3, but can result in collisions of message 3 from EDT-capable UEs and legacy UEs since an EDT capable UE and a legacy UE will both use the same resources (potentially with different MCSs if EDT is scheduled). However, this compromise approach recognizes that preamble collision between EDT capable UEs and legacy UEs may not occur very often if the load is small, and much of the time a first transmission of Message 3 will get through. In this case the use of different interpretations of the RAR scheduling message for message 3 by different types of UE to help avoid collision (which results in the eNB blind decoding for different frequency hopping patterns, different narrowband resources, different time delays, different RNTI etc.) may not be warranted, but it can instead be adopted to help resolve collisions for retransmissions of message three for a terminal device when its initial message three does collide. It will be appreciated approaches in which different terminal devices interpret a scheduling message for retransmissions of message three differently may be implemented using the same principles as set out above in which a scheduling message for an initial message three is interpreted differently. In an LTE context the scheduling information for an initial message three is conveyed in information within RAR, whereas the scheduling information for a retransmission of message three is conveyed in downlink control information (DCI) in a common search space with a control message on PDCCH, but this does not in itself impact the principle of different terminal devices interpreting the scheduling message differently as discussed herein.

In some example implementations an initial Message 3 transmission might always use the legacy format. That is to say, even for an EDT capable UE, the first Message 3 transmission scheduled by RAR does not contain EDT. Instead the EDT is scheduled in a retransmission of the Message 3. I.e. the Message 3 with EDT in effect has two parts, where the first part contains a legacy Message 3 (no EDT) and the 2nd part contains the additional EDT data. The UL grant for retransmission of Message 3 would thus allocate resources for EDT capable UEs to transmit the EDT. The 2nd part of this Message 3 transmission could be any of the following, for example based on an indication in the UL grant scheduling retransmission of Message 3:

A retransmission of a legacy Message 3. This can be decoded by both EDT capable UE and legacy UE Transmission of EDT. This can be decoded only by an EDT capable UE Transmission of legacy Message 3 and EDT. This can be decoded only by an EDT capable UE. Here a collision of preambles causing a collision of Message 3 between an EDT capable UE and a legacy UE may occur and the eNB can therefore use this indicator to stop the legacy UE from performing retransmission.

Figure 10:
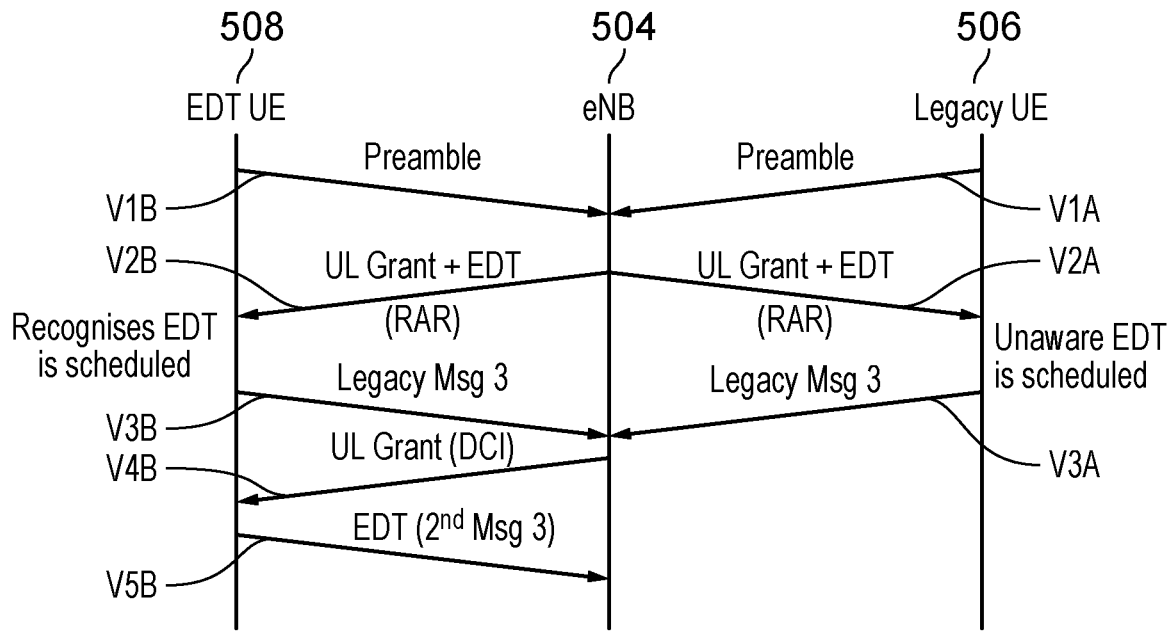

An example of this approach is shown in FIG. 10, where an EDT capable UE and a legacy UE transmit the same preamble causing a collision (steps V1A and V1B). The eNB responds with a RAR indicating that EDT is enabled, e.g. by setting the reserved bit in the RAR (steps V2A and V2B). The EDT capable UE recognizes the EDT indicator but as per this example, the first Message 3 transmission uses the legacy Message 3, i.e. without EDT (step V3B). Meanwhile the legacy UE not recognizing the EDT indicator would just transmit a legacy Message 3 as normal (step V3A). The eNB receives both the Message 3 from the EDT UE (in step V3B) and the Message 3 from the legacy UE (in step V3A). The eNB then transmits an UL grant using DCI using the established Message Retransmission mechanism, to the EDT capable UE (step V4B). Since the EDT capable UE is aware that the eNB has enabled EDT (from the flag received in the RAR in step V2B), it will monitor for this UL grant and interpret/decode it differently in accordance with the principles discussed herein, since this UL grant can indicate for legacy Message 3 retransmission or EDT transmission. In this example, the UL grant indicates an EDT transmission. The EDT capable UE therefore transmits the EDT as the 2nd part of Message 3 using the retransmission mechanism (step V5B). It should be appreciated that if there is no EDT capable UE involved in the random access procedure, the eNB will not receive a 2nd Message 3 transmission back, i.e. the eNB schedules a PUSCH resource in step V4B for an EDT retransmission without knowing whether there is an EDT capable UE requiring this allocation. Although in this example the EDT capable UE monitors for the UL grant for the 2nd part of Message 3 when the RAR indicates that EDT is enabled, in other implementations, the EDT capable UE may monitor for this UL grant regardless of whether there is an EDT indication signalled in the RAR.

In another example, the UL grant for the 2nd part of the Message 3 that transmits EDT may use a different format to that of the legacy grant. Hence, when the 2nd part of the Message 3 is used to transmit EDT, or Message 3 and EDT, a different DCI format may be used which is not decodable by the legacy UE, thereby preventing the legacy UE from further retransmission of Message 3.

In another example, the UL grant for the 2nd part of the Message 3 that transmits EDT may use a different temporary C-RNTI (cell-specific radio network temporary identifier). The temporary C-RNTI is issued by the RAR. The legacy UE will use this C-RNTI directly for decoding of subsequent DCI (until a [non-temporary] C-RNTI is issued in the Message 4 (step S4 in FIG. 2)). Here, the EDT capable UE will use a different temporary C-RNTI, for example by using a function that converts the temporary C-RNTI to a temporary EDT-RNTI. This said function can be as simple as applying an offset value and can be signalled in the SIB, RRC configuration or specified in the specifications.

In another example, the UL grant for the 2nd part of the Message 3 may be indicated by using a specific predefined combination of settings for fields in a legacy DCI. Here some values in some fields in the legacy DCI, e.g. MCS or Resource Allocation field, have states that are not used for legacy allocations (i.e. the number of bits required for these fields is more than the number of values conveyed in these fields) and so some combination of unused states may be defined to indicate that the UE will either transmit EDT, or EDT and Message 3, in the retransmission. For example, the different combination of values may tell the UE that a larger TBS has been allocated for EDT.

Figure 11:
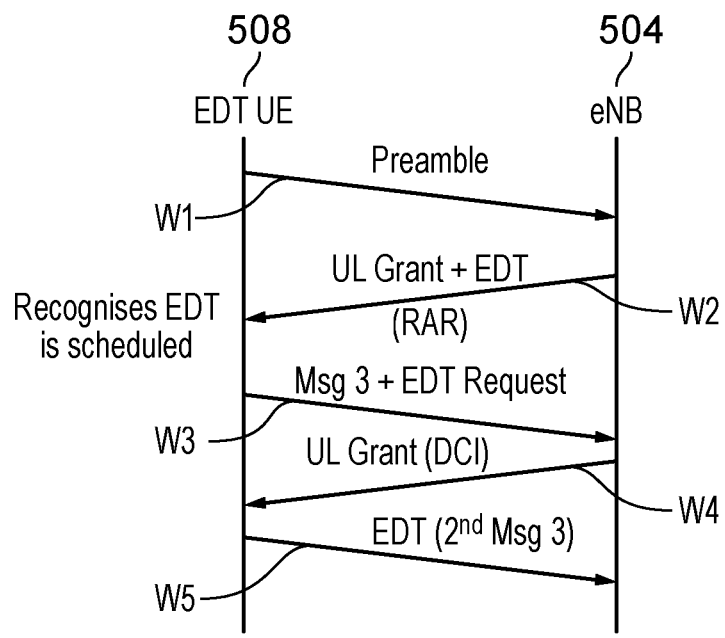

In another example, the Message 3 transmitted by an EDT capable UE may indicate a request for EDT. As described herein, if a preamble is shared between an EDT capable UE and a legacy UE (e.g., as for the EDT set of preambles in FIG. 3), the eNB would not know whether a received preamble is from an EDT capable UE or from a legacy UE. Hence, this example approach can be used in conjunction with the previous example where only the 2nd part of Message 3 is used for EDT. In one implementation, the UE may transmit the EDT request in Message 3 only when the RAR indicated that EDT is enabled, e.g. by setting the reserved bit. In another implementation, this EDT request in Message 3 may be transmitted independently of the EDT indication in the RAR. This may be considered advantageous in some scenarios because it can help reduce the need for blind decoding different resources for EDT. As mentioned for the example illustrated in FIG. 10, when the eNB sends an UL grant for EDT in the 2nd Message 3, the eNB at this point does not know whether there will be an EDT capable UE and would therefore blindly reserve PUSCH resources. This can be avoided using this approach since the Message 3 would indicate the need for an EDT. This approach is also useful regardless of whether there is a preamble collision or not. An example is shown FIG. 11, where an EDT capable UE transmits a preamble to the eNB (step W1). Here no preamble collision occurs but the eNB cannot tell whether the UE is an EDT capable or a legacy UE, and it transmits a RAR with an indication that EDT (if needed) is enabled, e.g. by setting the reserved bit in the RAR (step W2). The EDT UE recognizes the EDT indicator and since it has data to transmit would transmit the Message 3 together with an EDT request to the eNB (step W3). The eNB recognizing this EDT request would then transmit an UL Grant for the EDT (step W4), where this EDT is transmitted using the Message 3 Retransmission Mechanism, i.e. the retransmission discussed above for other examples to enable the UL grant to provide a large TBS for EDT. The EDT-UE responds by transmitting the EDT (second Message 3) on the allocated resources (step S5).

In some examples, the request for EDT in Message 3 may include an indication of the transport block size that is desired for the EDT. This TBS size indication may, for example, be jointly encoded with the request for EDT itself. For example, 2 bits in the Message 3 could be used to indicate one of four different requests, such as:

'00': no EDT requested
 '01': EDT requested for TBS=250 bits
 '10': EDT requested for TBS=500 bits
 '11': EDT requested for TBS=1000 bits In some examples, the request for EDT in Message 3 may be indicated using an existing spare bit in the Message 3—in an LTE context there is one bit spare in the existing Message 3 format which could be used for EDT capable UEs for this case.

In some examples, the request for EDT in Message 3 may be indicated using the "establishmentCause" field in Message 3 in an LTE context. The "establishmentCause" field is used by a legacy UE to indicate whether the RRC Connection Request is of high priority, mobile originated or mobile terminated call or delay-tolerant access. However in this example a new establishment cause can be used to indicate a request for EDT.

In some of the examples discussed herein, the eNB can blind decode a received Message 3 under the two hypotheses that (a) the RAR was interpreted by the UE as an EDT UL grant and (b) that the RAR was interpreted by the UE as a legacy UL grant. However, in other examples, blind decoding might not be used. For example, for cases where the frequency resources are interpreted differently for EDT transmissions, the eNodeB may apply "legacy type decoding" to frequency resources assigned to legacy transmissions and "EDT type decoding" to frequency resources assigned to EDT transmissions.

FIG. 12 is a flow diagram schematically representing a method of operating a network infrastructure equipment (base station) in a wireless telecommunications system to support first and second random access procedures, wherein a message size for an uplink message of the second random access procedure is different to a message size for a corresponding uplink message of the first random access procedure in accordance with the principles discussed herein. In the first step of the process represented in FIG. 12 the network infrastructure equipment transmits a scheduling message comprising an indication of a first set of radio resources to be used for a random access procedure message for the first random access procedure. In the second step of the process represented in FIG. 12 the network infrastructure equipment determines a second set of radio resources to be used for a random access procedure message for the second random access procedure, wherein the second set of radio resources is determined from the first set of radio resources in accordance with a predefined mapping between the first set of radio resources and the second set of radio resources. In the third step of the process represented in FIG. 12 the network infrastructure equipment monitors for a random access procedure message on both the first set of radio resources and the second set of radio resources.

FIG. 13 is a flow diagram schematically representing a method of operating a terminal device in a wireless telecommunications system that supports first and second random access procedures, wherein a message size for an uplink message of the second random access procedure is different to a message size for a corresponding uplink message of the first random access procedure in accordance with the principles discussed herein. In the first step of the process represented in FIG. 13 the terminal device receives a scheduling message comprising an indication of a first set of radio resources to be used for a random access procedure message for the first random access procedure. In the second step of the process represented in FIG. 13 the terminal device determines a second set of radio resources to be used for a random access procedure message for the second random access procedure, wherein the second set of radio resources is determined from the first set of radio resources in accordance with a predefined mapping between the first set of radio resources and the second set of radio resources. In the third step of the process represented in FIG. 13 the terminal device transmits a random access procedure message using the second set of radio resources.

Thus there has been described a method of operating a network infrastructure equipment in a wireless telecommunications system to support first and second random access procedures, wherein a message size/amount of data for an uplink message of the second random access procedure is different to a message size/amount of data for a corresponding uplink message of the first random access procedure, and wherein the method comprises: transmitting a scheduling message comprising an indication of a first set of radio resources to be used for a random access procedure message for the first random access procedure; determining a second set of radio resources to be used for a random access procedure message for the second random access procedure, wherein the second set of radio resources is determined from the first set of radio resources in accordance with a predefined/predetermined mapping between the first set of radio resources and the second set of radio resources; and monitoring for a random access procedure message on both the first set of radio resources and the second set of radio resources.

It will be appreciated that while a message of a random access procedure including EDT data may in some cases have a message size which is larger than the message size of a corresponding message in a random access procedure that does not include EDT data, this is not always the case. For example, in some cases the EDT random access procedure message containing the additional data may have the same message size as the corresponding legacy (non-EDT) random access procedure message, but a different coding scheme.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored on a SIM card. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a network infrastructure equipment in a wireless telecommunications system to support first and second random access procedures, wherein an amount of data for an uplink message of the second random access procedure is different to an amount of data for a corresponding uplink message of the first random access procedure, and wherein the method comprises: transmitting a scheduling message comprising an indication of a first set of radio resources to be used for a random access procedure message for the first random access procedure; determining a second set of radio resources to be used for a random access procedure message for the second random access procedure, wherein the second set of radio resources is related to the first set of radio resources by a predefined relationship; and monitoring for a random access procedure message on both the first set of radio resources and the second set of radio resources.

Paragraph 2. The method of paragraph 1, wherein the predefined relationship is such that radio resources comprising the second set of radio resources are offset in frequency from corresponding radio resources comprising the first set of radio resources.

Paragraph 3. The method of paragraph 2, wherein the predefined relationship is such that the radio resources comprising the second set of radio resources are offset in frequency from the corresponding radio resources comprising the first set of radio resources by a predefined fixed offset.

Paragraph 4. The method of paragraph 2, wherein the predefined relationship is such that the radio resources comprising the second set of radio resources are offset in frequency from the corresponding radio resources comprising the first set of radio resources by a frequency offset derived from differences between frequencies for the radio resources comprising the first set of radio resources and a predefined fixed frequency.

Paragraph 5. The method of paragraph 2, wherein the predefined relationship is such that radio resources in a first subset of the second set of radio resources are offset in frequency from corresponding radio resources in a first subset of the first set of radio resources by a first frequency offset and radio resources in a second subset of the second set of radio resources are offset in frequency from corresponding radio resources in a second subset of the first set of radio resources by a second frequency offset, wherein the first and second frequency offsets have the same magnitude and are in different directions.

Paragraph 6. The method of paragraph 5, wherein the magnitude of the first and second frequency corresponds with a difference between the frequencies for radio resources in the first subset of the first set of radio resources and the frequencies for radio resources in the second subset of the first set of radio resources.

Paragraph 7. The method of any one of paragraphs 1 to 6, wherein the predefined relationship is such that radio resources comprising the second set of radio resources are offset in time from corresponding radio resources comprising the first set of radio resources.

Paragraph 8. The method of any one of paragraphs 1 to 7, wherein one of the first and second sets of radio resources comprises more radio resources than the other of the first and second sets of radio resources.

Paragraph 9. The method of any one of paragraphs 1 to 8, wherein the first random access procedures comprises a first series of random access procedure messages and the second random access procedure comprises a second series of random access procedure messages, wherein each series of random access procedure messages comprises a random access request message received by the network infrastructure equipment from a terminal device, a random access response message transmitted from the network infrastructure equipment to the terminal device in response to receiving the first random access request message, and a message three received by the network infrastructure equipment from the terminal device using radio resources allocated in the first random access response message.

Paragraph 10. The method of paragraph 9, wherein the message three of the second random access procedure is the uplink message of the second random access procedure having an amount of data which is different to an amount of data for the corresponding uplink message of the first random access procedure, the corresponding uplink message of the first random access procedure being the message three of the first random access procedure.

Paragraph 11. The method of paragraph 9 or 10, wherein the scheduling message comprises the random access response message for both the first and second random access procedures and the first set of radio resources are for use for the message three of the first random access procedure and the second set of radio resources are for use for the message three of the second random access procedure.

Paragraph 12. The method of paragraph 9 or 10, wherein the scheduling message comprises a request for a retransmission of the message three for both the first and second random access procedures and the first set of radio resources are for use for a retransmission of the message three of the first random access procedure and the second set of radio resources are for use for a retransmission of the message three of the second random access procedure.

Paragraph 13. The method of paragraph 12, wherein the second set of radio resources comprises an amount of radio resources sufficient for communicating an additional amount of uplink data for the second random access procedure compared to the first random access procedure.

Paragraph 14. The method of any one of paragraphs 9 to 13, wherein the scheduling message comprises an indication the scheduling message applies for the second random access procedure as well as for the first random access procedure.

Paragraph 15. A network infrastructure equipment for use in a wireless telecommunications system to support first and second random access procedures, wherein an amount of data for an uplink message of the second random access procedure is different to an amount of data for a corresponding uplink message of the first random access procedure, wherein the network infrastructure equipment comprises controller circuitry and transceiver circuitry configured such that the network infrastructure equipment is operable to: transmit a scheduling message comprising an indication of a first set of radio resources to be used for a random access procedure message for the first random access procedure; determine a second set of radio resources to be used for a random access procedure message for the second random access procedure, wherein the second set of radio resources is related to the first set of radio resources by a predefined relationship; and monitor for a random access procedure message on both the first set of radio resources and the second set of radio resources.

Paragraph 16. Integrated circuitry for a network infrastructure equipment for use in a wireless telecommunications system to support first and second random access procedures, wherein an amount of data for an uplink message of the second random access procedure is different to an amount of data for a corresponding uplink message of the first random access procedure, wherein the integrated circuitry comprises controller circuitry and transceiver circuitry configured to operate together such that the terminal device is operable to: transmit a scheduling message comprising an indication of a first set of radio resources to be used for a random access procedure message for the first random access procedure; determine a second set of radio resources to be used for a random access procedure message for the second random access procedure, wherein the second set of radio resources is related to the first set of radio resources by a predefined relationship; and monitor for a random access procedure message on both the first set of radio resources and the second set of radio resources.

Paragraph 17. A method of operating a terminal device in a wireless telecommunications system that supports first and second random access procedures, wherein an amount of data for an uplink message of the second random access procedure is different to an amount of data for a corresponding uplink message of the first random access procedure, and wherein the method comprises: receiving a scheduling message comprising an indication of a first set of radio resources to be used for a random access procedure message for the first random access procedure; determining a second set of radio resources to be used for a random access procedure message for the second random access procedure, wherein the second set of radio resources is related to the first set of radio resources by a predefined relationship; and transmitting a random access procedure message using the second set of radio resources.

Paragraph 18. A terminal device for use in a wireless telecommunications system that supports first and second random access procedures, wherein an amount of data for an uplink message of the second random access procedure is different to an amount of data for a corresponding uplink message of the first random access procedure, wherein the terminal device comprises controller circuitry and transceiver circuitry configured such that the terminal device is operable to: receive a scheduling message comprising an indication of a first set of radio resources to be used for a random access procedure message for the first random access procedure; determine a second set of radio resources to be used for a random access procedure message for the second random access procedure, wherein the second set of radio resources is related to the first set of radio resources by a predefined relationship; and transmit a random access procedure message using the second set of radio resources.

Paragraph 19. Integrated circuitry for a terminal device for use in a wireless telecommunications system that supports first and second random access procedures, wherein an amount of data for an uplink message of the second random access procedure is different to an amount of data for a corresponding uplink message of the first random access procedure, wherein the integrated circuitry comprises controller circuitry and transceiver circuitry configured to operate together such that the terminal device is operable to: receive a scheduling message comprising an indication of a first set of radio resources to be used for a random access procedure message for the first random access procedure; determine a second set of radio resources to be used for a random access procedure message for the second random access procedure, wherein the second set of radio resources is related to the first set of radio resources by a predefined relationship; and transmit a random access procedure message using the second set of radio resources.

REFERENCES

RP-161464, "Revised WID for Further Enhanced MTC for LTE," Ericsson, 3GPP TSG RAN Meeting #73, New Orleans, USA, Sep. 19-22, 2016

RP-161901, "Revised work item proposal: Enhancements of NB-IoT", Huawei, HiSilicon, 3GPP TSG RAN Meeting #73, New Orleans, USA, Sep. 19-22, 2016

RP-170732, "New WID on Even further enhanced MTC for LTE," Ericsson, Qualcomm, 3GPP TSG RAN Meeting #75, Dubrovnik, Croatia, Mar. 6-9, 2017

RP-170852, "New WID on Further NB-IoT enhancements," Huawei, HiSilicon, Neul, 3GPP TSG RAN Meeting #75, Dubrovnik, Croatia, Mar. 6-9, 2017

Holma H. and Toskala A, "LTE for UMTS OFDMA and SC-FDMA based radio access", John Wiley and Sons, 2009

3GPP TS36.213 (Release 14)

3GPP TS36.321 (Release 14)

The invention claimed is:

1. A method of operating a network infrastructure equipment in a wireless telecommunications system to support first and second random access procedures, wherein an amount of data for an uplink message of the second random access procedure is different from an amount of data for a corresponding uplink message of the first random access procedure, and wherein the method comprises:

transmitting a common scheduling message comprising at least an indication of a first set of radio resources to be used for a first random access procedure message for the first random access procedure to be performed by a first set of one or more terminal devices;

based on the common scheduling message, determining a second set of radio resources to be used for a second random access procedure message for the second random access procedure, different from the first random access procedure, to be performed by a second set of one or more terminal devices that do not overlap with the first set of one or more terminal devices, wherein the second set of radio resources is related to the first set of radio resources by a predefined relationship in the form of mapping; and performing random access procedure message monitoring on both the first set of radio resources and the second set of radio resources relative to the first set of one or more terminal devices and the second set of one or more terminal devices, respectively, wherein said determining the second set of radio resources is performed using a second mapping or derivation function different from a first mapping or derivation function associated to derive the first set of radio resources, wherein the first set of one or more terminal devices are of a first type of terminal device and the second set of one or more terminal devices are of a second type of terminal device different from the first type of terminal device.

2. The method of claim 1, wherein the predefined relationship is such that radio resources comprising the second set of radio resources are offset in frequency from corresponding radio resources comprising the first set of radio resources.

3. The method of claim 2, wherein the predefined relationship is such that the radio resources comprising the second set of radio resources are offset in frequency from the corresponding radio resources comprising the first set of radio resources by a predefined fixed offset.

4. The method of claim 2, wherein the predefined relationship is such that the radio resources comprising the second set of radio resources are offset in frequency from the corresponding radio resources comprising the first set of radio resources by a frequency offset derived from differences between frequencies for the radio resources comprising the first set of radio resources and a predefined fixed frequency.

5. The method of claim 2, wherein the predefined relationship is such that radio resources in a first subset of the second set of radio resources are offset in frequency from corresponding radio resources in a first subset of the first set of radio resources by a first frequency offset and radio resources in a second subset of the second set of radio resources are offset in frequency from corresponding radio resources in a second subset of the first set of radio resources by a second frequency offset, wherein the first and second frequency offsets have a same magnitude and are in different directions.

6. The method of claim 5, wherein the same magnitude of the first and second frequency corresponds with a difference between the frequencies for radio resources in the first subset of the first set of radio resources and the frequencies for radio resources in the second subset of the first set of radio resources.

7. The method of claim 1, wherein the predefined relationship is such that radio resources comprising the second set of radio resources are offset in time from corresponding radio resources comprising the first set of radio resources.

8. The method of claim 1, wherein one of the first and second sets of radio resources comprises more radio resources than the other of the first and second sets of radio resources.

9. The method of claim 1,
wherein the first random access procedures comprises a first series of random access procedure messages and the second random access procedure comprises a second series of random access procedure messages, and
wherein each of the first and second series of random access procedure messages comprises a random access request message received by the network infrastructure equipment from one of the terminal devices of the first or second sets of one or more terminal devices, a random access response message transmitted from the network infrastructure equipment to the terminal device in response to receiving the first random access request message, and a message three received by the network infrastructure equipment from the one of terminal devices using radio resources allocated in the random access response message.

10. The method of claim 9, wherein the message three of the second random access procedure is the uplink message of the second random access procedure having an amount of data which is different to an amount of data for the corresponding uplink message of the first random access procedure, the corresponding uplink message of the first random access procedure being the message three of the first random access procedure.

11. The method of claim 9, wherein the common scheduling message comprises the random access response message for both the first and second random access procedures and the first set of radio resources are for use for the message three of the first random access procedure and the second set of radio resources are for use for the message three of the second random access procedure.

12. The method of claim 9, wherein the common scheduling message comprises a request for a retransmission of the message three for both the first and second random access procedures and the first set of radio resources are for use for a retransmission of the message three of the first random access procedure and the second set of radio resources are for use for a retransmission of the message three of the second random access procedure.

13. The method of claim 12, wherein the second set of radio resources comprises an amount of radio resources sufficient for communicating an additional amount of uplink data for the second random access procedure compared to the first random access procedure.

14. The method of claim 9, wherein the common scheduling message comprises an indication the common scheduling message applies for the second random access procedure as well as for the first random access procedure.

15. A network infrastructure equipment for use in a wireless telecommunications system to support first and second random access procedures, wherein an amount of data for an uplink message of the second random access procedure is different from an amount of data for a corresponding uplink message of the first random access procedure, wherein the network infrastructure equipment comprises controller circuitry and transceiver circuitry configured such that the network infrastructure equipment is operable to:

transmit a common scheduling message comprising at least an indication of a first set of radio resources to be used for a first random access procedure message for the first random access procedure to be performed by a first set of one or more terminal devices;

based on the common scheduling message, determine a second set of radio resources to be used for a second random access procedure message for the second random access procedure, different from the first random access procedure. to be performed by a second set of one or more terminal devices that do not overlap with the first set of one or more terminal devices, wherein the second set of radio resources is related to the first set of radio resources by a predefined relationship in the form of mapping and/or derivation function; and perform random access procedure message monitoring for a random access procedure message on both the first set of radio resources and the second set of radio resources relative to the first set of one or more terminal devices and the second set of one or more terminal devices, respectively, wherein the predefined relationship is based on mapping the first set of radio resources to the second set of radio resources, and wherein the first set of one or more terminal devices are of a first type of terminal device and the second set of one or more terminal devices are of a second type of terminal device different from the first type of terminal device.

16. A terminal device for use in a wireless telecommunications system that supports first and second random access procedures, wherein an amount of data for an uplink message of the second random access procedure is different from an amount of data for a corresponding uplink message of the first random access procedure, wherein the terminal device is part of a first set of one or more terminal devices to each perform the first random access procedure, and wherein the terminal device comprises controller circuitry and transceiver circuitry configured such that the terminal device is operable to:

receive a common scheduling message comprising at least an indication of a first set of radio resources to be used for a first random access procedure message for the first random access procedure to be performed by the terminal device;

based on the common scheduling message, determine a second set of radio resources to be used for a second random access procedure message for the second random access procedure, different from the first random access procedure, to be performed by a second set of one or more terminal devices that do not overlap with the first set terminal devices, wherein the second set of radio resources is related to the first set of radio resources by a predefined relationship in the form of mapping and/or derivative function; and transmit the second random access procedure message using the second set of radio resources, wherein the predefined relationship is based on mapping the first set of radio resources to the second set of radio resources, wherein said determining the second set of radio resources is performed using a second mapping or derivation function different from a first mapping or derivation function to derive the first set of radio resources, wherein the terminal device is of a first type of terminal device and the one or more terminal devices of the second set are of a second type of terminal device different from the first type of terminal device.

17. The method of claim 1, wherein said determining is performed at a user interface.

18. The method of claim 1, wherein the predefined relationship is based on mapping the first set of radio resources to the second set of radio resources.

19. The method of claim 1, wherein said determining the second set of radio resources is performed by either each of the one or more terminal devices of the first set or each of the one or more terminal devices of the second set.

* * * * *